(12) United States Patent
Langdon

(10) Patent No.: US 7,114,393 B2
(45) Date of Patent: Oct. 3, 2006

(54) METHOD AND APPARATUS FOR LASER VIBROMETRY

(75) Inventor: Roger Martin Langdon, Chelmsford (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 10/512,047

(22) PCT Filed: Apr. 17, 2003

(86) PCT No.: PCT/GB03/01672
§ 371 (c)(1),
(2), (4) Date: Oct. 21, 2004

(87) PCT Pub. No.: WO03/089955
PCT Pub. Date: Oct. 30, 2003

(65) Prior Publication Data
US 2005/0160822 A1     Jul. 28, 2005

(30) Foreign Application Priority Data
Apr. 22, 2002 (GB) .................................. 0209053.8

(51) Int. Cl.
*G10N 9/24* (2006.01)
(52) U.S. Cl. ............................ 73/643; 73/655; 73/657; 356/621; 102/52
(58) Field of Classification Search ...................... None
See application file for complete search history.

(56) References Cited

U.S. PATENT DOCUMENTS

| | | | | |
|---|---|---|---|---|
| 3,633,999 A | * | 1/1972 | Buckles | ...................... 359/577 |
| 4,545,025 A | * | 10/1985 | Hepner et al. | ............... 708/422 |
| 4,795,231 A | * | 1/1989 | Tanabe | ......................... 385/60 |
| 4,824,250 A | * | 4/1989 | Newman | ..................... 356/502 |
| 4,934,815 A | * | 6/1990 | Tai et al. | ..................... 356/512 |
| 5,841,030 A | | 11/1998 | Honsberg et al. | |
| 6,034,760 A | | 3/2000 | Rees | |

FOREIGN PATENT DOCUMENTS

| | | |
|---|---|---|
| EP | 0 564 112 A | 10/1993 |
| EP | 1 148 321 A | 10/2001 |
| GB | 2173064 | 1/1986 |
| GB | 2265514 A | 9/1993 |
| WO | WO 86/06845 | * 11/1986 |
| WO | WO 86/06845 A | 11/1986 |

* cited by examiner

*Primary Examiner*—Hezron Williams
*Assistant Examiner*—Rose M. Miller
(74) *Attorney, Agent, or Firm*—Crowell & Moring LLP

(57) ABSTRACT

Apparatus and method for identifying a remote target (7; 7a) is described. The remote target (6; 6a) is illuminated with radiation (5; 5a) generated by a laser (1; 1a) and the radiation scattered by the target (6; 6a) is modulated in phase by the surface (6; 6a) vibrations of the target (7; 7a). A portion of the scattered radiation is collected by multiple optical receivers (8, 9, 10; 8a, 9a, 10a) and demodulated by a phase demodulator to generate a signal proportional to the vibrational displacement of the remote target (7; 7a). The radiation scattered by the remote target (7; 7a) will also include laser 'speckle', generated when radiation is scattered by a rough solid surface. This speckle can generate errors in the signal demodulated, which can in turn cause identification errors. Apparatus is disclosed where the signals generated are substantially unaffected by laser speckle, improving the accuracy of remote target identification.

13 Claims, 2 Drawing Sheets

METHOD AND APPARATUS FOR LASER VIBROMETRY

Figure 1:
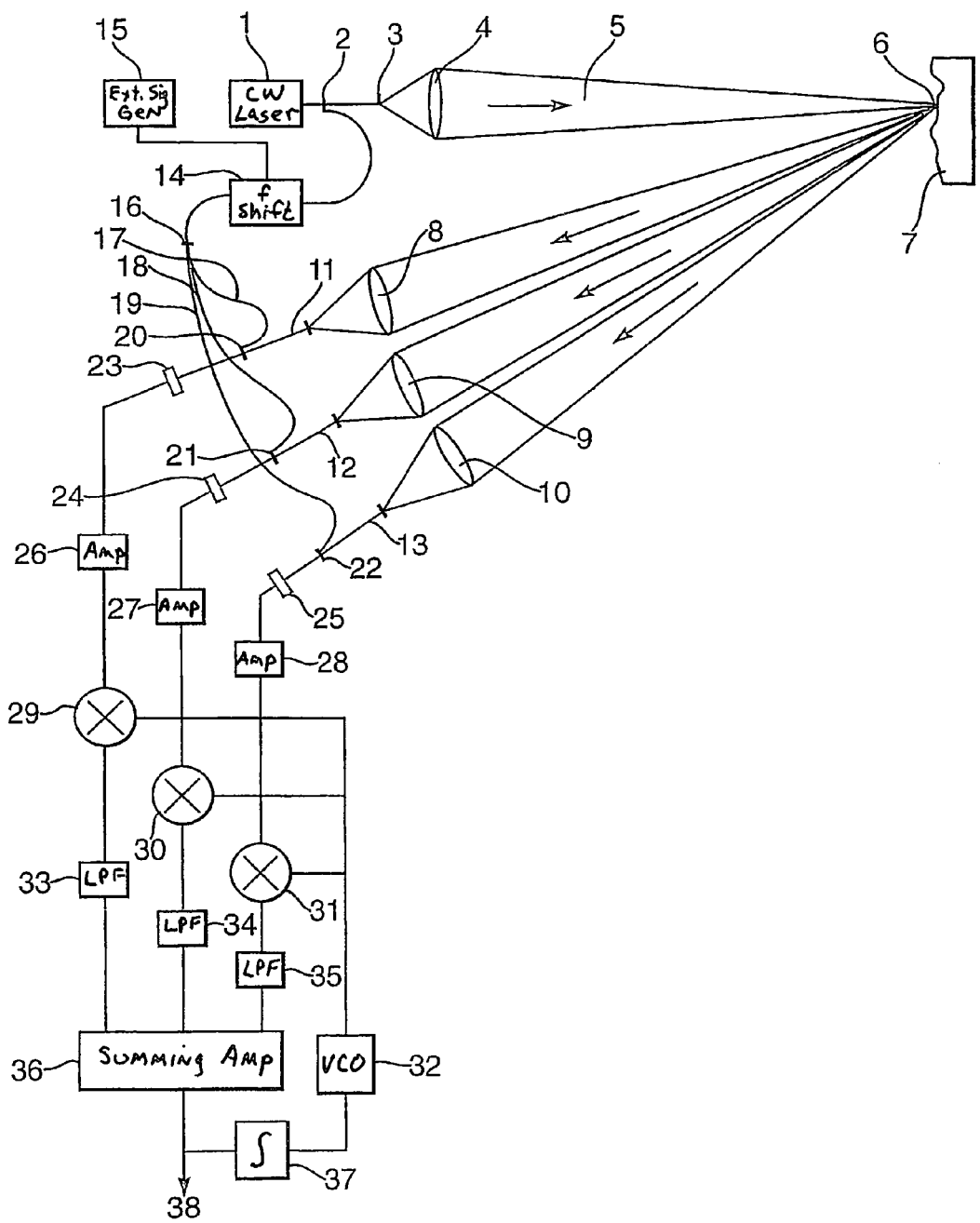

This invention relates to methods and apparatus for processing signals from laser vibrometers. More particularly, but not exclusively, the invention relates to methods and apparatus for processing signals from laser vibrometers having a number of separate coherent optical receivers.

Laser vibrometry is a technique for detecting mechanical vibrations of remote objects by illuminating them with laser light. Laser light scattered from objects is modulated in phase by surface vibrations, so collecting a portion of the scattered light in a coherent optical receiver and passing it through a phase demodulator generates a signal proportional to the vibrational displacement of the object. The technique can be used to measure the vibration spectra of large remote structures such as aircraft in flight, and may be used to identify particular aircraft in terms of their known characteristic spectra. Laser vibrometry is particularly useful for identifying aircraft at very long range where the aircraft shape cannot be resolved by conventional imaging techniques.

Laser vibrometry requires a laser operating at a very stable single frequency in order to accurately measure the phase of the return signal. Such laser light produces speckle patterns when scattered by a rough solid surface, producing a field of spatially varying amplitude and phase across the aperture of the receiver lens. The speckle pattern moves relative to the receiver lens as the target moves about, resulting in a received signal varying widely and unpredictably in amplitude and phase. At certain times the received signal can be almost zero, resulting in a temporary inability to monitor the target vibrations. This can cause errors in the identification of the structures being targeted.

One method for overcoming this problem is described in GB 2,265,514. In the method and apparatus described, the problem is overcome by providing a number of separate optical receivers, all receiving scattered light from the target, but spaced from each other by a distance comparable with, or larger than, the mean speckle size in the vicinity of the receivers. Each receiver phase-demodulates the scattered light it receives, to produce an output signal corresponding to the vibrations of the target. However, the speckle fluctuations at each receiver are substantially uncorrelated with the others, so the signal amplitudes from each receiver pass through minima at different times, so combining the demodulated outputs from each receiver with the others produces a composite signal in which temporary loss of vibrational data from the target is minimised or eliminated.

However, in the method and apparatus described, it is not a straightforward matter to define the optimum method for combining the demodulated outputs from the receiver array to maintain a constant vibration signal, and to minimise the overall receiver noise. For example, a simple addition of the demodulated signals does not give the optimum result.

According to the invention there is provided, a laser vibrometer for identifying remote targets by detecting mechanical vibrations therein, said vibrometer having an array of coherent optical receivers for collecting a portion of laser light reflected by a remote target, each receiver providing a coherent output and signal processor means for combining said coherent outputs of the receivers to produce a signal representative of the remote target and for removing laser speckle.

Optionally, the signal processors may comprise a phase-locked loop having multiple inputs, in which the signal derived from the multiple inputs is representative of the remote target, substantially unaffected by laser speckle. Preferably, the phase-locked loop may comprise multiple signal multipliers, said multipliers multiplying the input signals by a further signal generated by a voltage controlled oscillator. Conveniently, the further signal may comprise a sinusoidal or a square wave. Advantageously, the phase-locked loop may further comprise multiple low pass filters, said filters having cut-off frequencies in the kilohertz region. Preferably, the phase-locked loop further may comprise a summing amplifier which sums the signals generated by the multiple low pass filters and outputs a signal to an integrator and, optionally, the integrator may output a signal to an input of the voltage control oscillator, said voltage control oscillator generating a signal which is input into the inputs of the multiple signal multipliers.

Preferably, the signal processors may comprise an autocovariance processor having multiple inputs, in which the signal derived from the multiple inputs is representative of the remote target, substantially unaffected by laser speckle. Advantageously, the signals output by the multiple receivers may be passed to conversion means, said conversion means sampling the input signals to produce digital outputs in response to timing signals generated by a timing pulse generator. Conveniently, the signals output by the multiple receivers may be further passed to time delay means, said time delay means delaying the input signals by approximately 0.25 of a cycle at the centre frequency of the signals from the receivers. Optionally, the time-delayed signals may be passed to further conversion means, said further conversion means sampling the input signals to produce digital outputs in response to timing signals generated by a timing pulse generator. Preferably, the laser vibrometer may further comprise summation means, for receiving the first and second converted signals, said converted signals comprising signal pairs, and performing a summation on said pairs of signals, said summation causing the signal due to the laser speckle to be greatly reduced and a signal representative of the mechanical vibration of the remote target to be output by the summation means.

According to the invention there is further provided, a method of detecting the mechanical vibrations of a remote target using a laser vibrometer, comprising the steps of:
(a) illuminating the remote target with laser light;
(b) collecting a portion of the laser light reflected by the remote target by means of an array of coherent optical receivers, each receiver providing a coherent output;
(c) processing said coherent outputs by combining together said coherent outputs in order to generate a signal representative of the mechanical vibration of the remote target that is substantially unaffected by laser speckle.

In this way, signals from each receiver are combined, either by means of a phased-locked loop with multiple inputs, for example, or by means of a complex autocovariance processor with multiple inputs, as a further example, to yield an output signal representing the vibration of a remote surface illuminated by a laser beam, but minimising signal fluctuations caused by laser speckle.

This invention describes alternative techniques for combining vibrometer signals from a receiver array to produce an optimum resultant signal, minimising noise and reducing or eliminating the possibility of temporary loss of signal.

Figure 2:
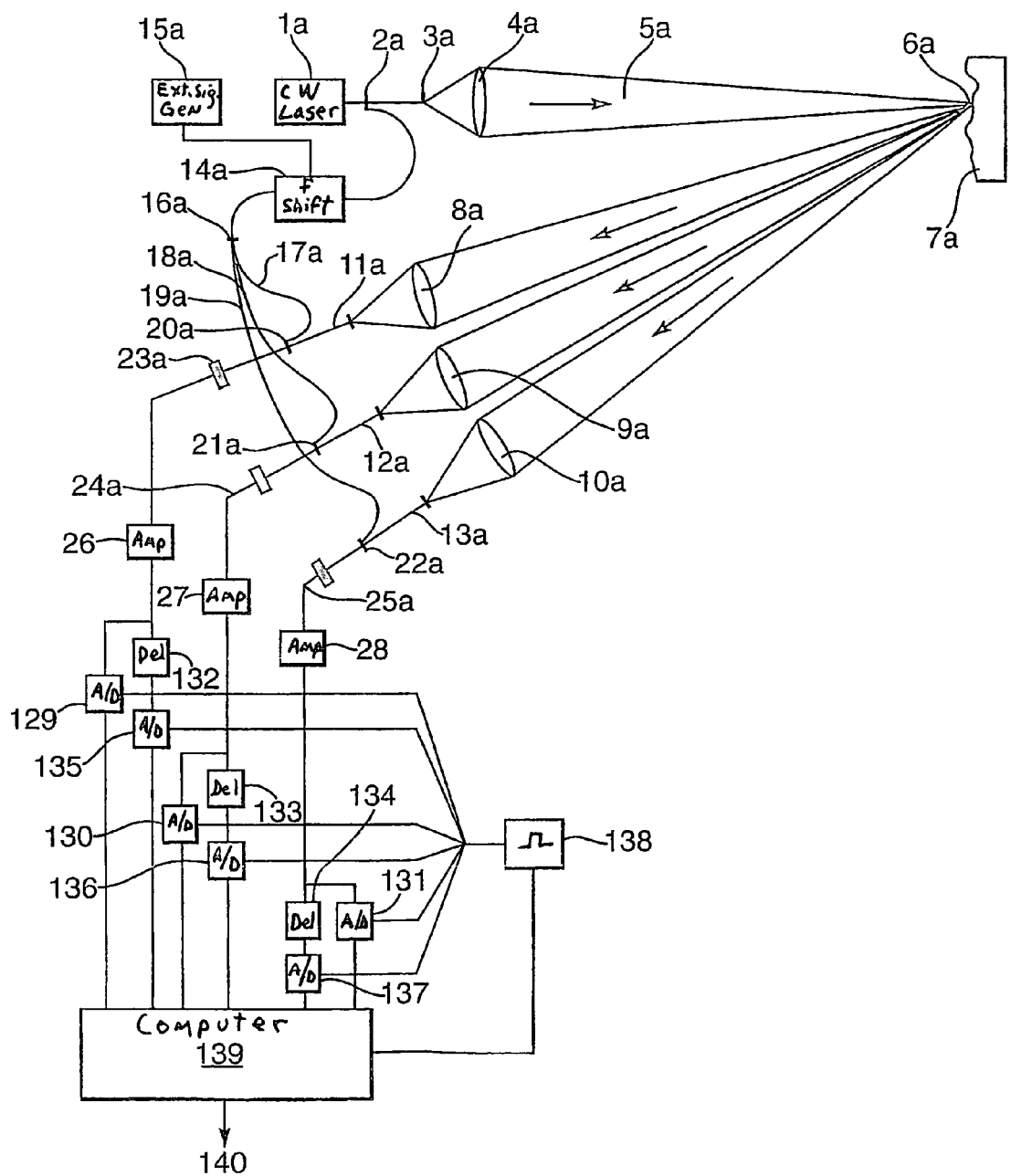

The invention will now be described with reference to the following drawings in which:

FIG. 1 shows a schematic representation of a laser vibrometer in accordance with the invention, in which the vibrometer includes a phase-locked loop with multiple inputs, the signals from which are combined and processed to represent, and hence identify, a remote surface illuminated by laser light; and FIG. 2 shows a schematic representation of a laser vibrometer in accordance with a second embodiment of the invention, in which the vibrometer includes a complex autocovariance processor with multiple inputs, the signals from which are combined and processed to represent, and hence identify, a remote surface illuminated by laser light.

FIG. 1 shows a laser vibrometer where light from a continuous wave laser 1, which may for example be a ring laser producing a stable single frequency output, passes through a single mode optical fibre into an optical fibre coupler 2. The coupler 2 divides the light into two output fibres. The output 3 from one of these fibres expands to fill lens 4 which collimates it into an approximately parallel beam 5. Beam 5 is focused onto the surface 6 of a remote vibrating target 7, which may for example be the skin of an aircraft in flight. Light is randomly scattered by surface 6, and a small part of it enters a cluster of remote optical receivers located close to laser 1. These are represented in FIG. 1 by three receiver lenses 8, 9 and 10 which focus the scattered light into the cores of three single mode optical fibres 11, 12 and 13. It will be appreciated that any number of suitable optical receivers may be used.

The second output fibre from fibre coupler 2 is passed through frequency shifter 14, which may for example be an acousto-optic device using surface acoustic waves. The function of 14 is to shift the frequency of the light passing through the device 14 by a fixed amount equal to the frequency applied to the device by an external signal generator 15. The drive frequency from signal generator 15 may typically be of the order of tens of megahertz, but may be any frequency from 10–1000 MHz. Light from frequency shifter 14 passes via a single mode optical fibre to a multi-way coupler 16 which divides it into a number of equal parts equal to the number of optical receivers. In the example shown in FIG. 1 fibre coupler 16 divides the light into three equal parts carried along three single mode optical fibres 17, 18 and 19.

These fibres pass into three optical fibre couplers 20, 21 and 22, where the light is mixed with signal light from the target surface 6 conducted along optical fibres 11, 12 and 13 respectively. The mixing produces optical interference between signal light from the target and reference light from the laser, giving rise to intensity modulation at the each of the outputs of fibre couplers 20, 21 and 22 at a frequency equal to the difference frequency between the light conducted along the two input fibres to each coupler. If the target surface 6 were stationary, the intensity modulation would be at the modulation frequency applied by signal generator 15 to frequency shifter 14, but if target surface 6 were moving, (as would be the case for an aircraft in flight, for example) the intensity modulation would be the difference between the frequencies from generator 15 and the Doppler shift arising from the motion of surface 6. In practice it is possible to make the generator frequency 15 track the Doppler frequency from surface 6, so that the intensity modulation is at an approximately constant frequency of a few megahertz, (for example 10 MHz).

The intensity modulated outputs from couplers 20, 21 and 22 are passed to photodiodes 23, 24 and 25 respectively which produce modulated photocurrents proportional to the light intensities. These photocurrents are amplified by amplifiers 26, 27 and 28, which contain band-pass filters centred on the intensity modulation frequency (for example 10 MHz).

The outputs from amplifiers 26, 27 and 28 are passed to analogue multipliers 29, 30 and 31 respectively where they are multiplied by a sinusoidal or square wave signal from voltage controlled oscillator (VCO) 32 which is designed to operate over a small range of frequencies close to the amplified photocurrent modulation frequencies emerging from amplifiers 26, 27 and 28.

The outputs from analogue multipliers 29, 30 and 31 contain components at the difference frequencies between the input signals which are very much lower than the photocurrent modulation frequencies, typically kilohertz rather than megahertz, so the difference frequencies can be selected by passing the outputs for 29, 30 and 31 through low pass filters 33, 34 and 35 respectively which have cut-off frequencies of a few kilohertz (for example 10 kHz).

The outputs of the low-pass filters 33, 34 and 35 are summed by a summing amplifier 36 and are passed through an integrator 37 to the frequency control input of VCO 32. The loop comprising VOC 32, multipliers, 29, 30, 31, low-pass filters 33, 34, 35, summing amplifier 36 and integrator 37 constitutes a phase-locked loop with multiple control inputs from the three optical receivers. The phase-locked loop stabilises at a frequency equal to the mean frequency of the three modulation signals from photodiodes 23, 24 and 25, weighted by the relative amplitudes of these three signals. Consequently when one or more of the outputs from photodiodes 23, 24 and 25 becomes small as a result of the motion of the speckle pattern from target surface 6, their contribution to the summed output from summing amplifier 36 is correspondingly small, and consequently they have little effect on the frequency of VCO 32.

Owing to the lack of correlation between speckle patterns at the inputs of the three optical receivers, at least one will produce a substantial modulated photocurrent from the photodiodes, and hence the phase-locked loop will remain in lock at a stable frequency regardless of speckle fluctuations. When the phase-locked loop has stabilised, the output from the summing amplifier 36 contains small voltage fluctuations due to periodic frequency fluctuations of the laser light scattered from target surface 6 due to surface vibration, so output 38 contains a voltage signal corresponding to the vibration of surface 6, but including only minor voltage fluctuations due to speckle.

A second embodiment of the invention will now be described in which the components performing the same function as those described with reference to the first embodiment will be described using the same reference numerals.

The laser vibrometer of the second embodiment works in the same fashion as that described in the first embodiment. However, a complex autocovariance processor with multiple inputs is used in place of a phase-locked loop.

In the second embodiment shown in FIG. 2, the amplified photocurrents emerging from the bandpass amplifiers 26, 27 and 28, are passed to analogue-digital converters 129, 130 and 131 respectively. The A/D converters sample the input signals and produce digital outputs in response to timing signals provided by timing pulse generator 138. The outputs from amplifiers 26, 27 and 28 are also passed through time delay circuits 132, 133 and 134 which delay the signals by approximately a quarter of a cycle at the centre frequency of the signals from amplifiers 26, 27 and 28. The outputs from the time delay circuits are therefore approximately in phase quadrature with respect to the inputs. The time delayed signals are passed to analogue/digital converters 135, 136 and 137 which sample the time-delayed waveforms in response to timing signals provided by pulse generator 138.

Pulse generator 138 produces a train of sampling pulses at an appropriate frequency in response to instructions from computer 139 (for example at a frequency of 10 MHz).

Digital outputs from all the A/D converters, 129, 130, 131, 135, 136 and 137 are passed to computer 139 which therefore receives both in-phase and quadrature signal samples from each of the three optical receivers shown in the example of FIG. 2. A computer 139 performs mathematical operations on this digital data.

The in-phase and quadrature signals taken together represent the complex amplitude of the optical signals received by telescope lenses 8, 9 and 10, so the magnitude of each complex pair (i.e. from A/D converters 129/135, 130/136 and 131/137) represents the mean signal amplitude from each receiver, and the argument represents the mean signal phase. Fluctuations in the signal phase caused by vibrational movements of the target surface 6 cause corresponding fluctuations in the arguments of the complex signals received by computer 139, so the computer needs to process these signals in an appropriate way to extract the variations in the arguments, and hence to recover a signal corresponding to the target vibration.

Each of the A/D converters 129, 130, 131, 135, 136, 137 samples the signals regularly at time intervals T determined by a regular pulse train from pulse generator 138. The $n^{th}$ complex signal from the $m^{th}$ receiver can therefore be represented as $$A_{n,m} = A0_{n,m}[\cos(\omega n\tau + \phi_{n,m}) + j\sin(\omega n\tau + \phi_{n,m})] + \text{Noise} \quad \text{(Equation 1)}$$

$$= A0_{n,m}\exp(j(\omega n\tau + \phi_{n,m})) + \text{Noise}$$

where $\omega$ is the angular frequency of the photocurrent from the $m^{th}$ receiver, $A0_{n,m}$ is the (real) signal amplitude of the $n^{th}$ sample of the $m^{th}$ receiver and $j=\sqrt{-1}$. $\phi_{n,m}$ is phase of the $n^{th}$ sample of the $m^{th}$ receiver, which is not necessarily the same for all receivers because speckle from target surface 6a causes random variations in phase between signals from one receiver and another. The term "Noise" in Equation 1 represents the random electrical noise in the receiver. The computer 139 is programmed to store a large number of such samples from all of the receivers simultaneously.

The computer 139 is programmed to multiply each of the samples $A_{n,m}$ by the complex conjugate of the following sample $A_{n+N,m}$, where N is a fixed integer, typically in the range from 1 to 1000, giving a result $B0_{n,m}$. Under normal circumstances the amplitude and phase of the speckle pattern changes relatively slowly by comparison with the signal modulation frequency $\omega$, so the difference in the phase $\phi_{n,m}$ between two multiplied samples of the same signal waveform is normally very small. $B0_{n,m}$ can therefore be written approximately as $$B0_{n,m} = A0_{n,m}\exp(j(\omega n\tau + \phi_{n,m}))A0_{n+N,m}\exp(-j(\omega(n + \quad \text{(Equation 2)}$$

$$N)\tau + \phi_{n+N,m})) + \text{Noise}$$

$$\cong A0_{n,m}A0_{n+N,m}\exp(j\omega N\tau) + \text{Noise}$$

$B0_{n,m}$ is referred to as the complex autocovariance of the sample pair $A_{n,m}$ and $A_{n+N,m}$. The product $A0_{n,m} A0_{n+N,m}$ is a real number for all sample pairs, which varies substantially with n and m because of the randomly varying intensity of speckle at each receiver. The "Noise" term in Equation 2 is normally small in comparison with the product $A0_{n,m}A0_{n+N,m}$, so a good estimate of the signal frequency $\omega$ can normally be obtained from the argument of $B0_{n,m}$ which is approximately equal to $\omega N\tau$. However, the product $A0_{n,m} A0_{n+N,m}$ can occasionally become very small when the receiver passes through a minimum of the speckle pattern, and can occasionally become zero, in which case no reliable estimate of the Doppler frequency can be obtained from the argument of $B0_{n,m}$. These errors in frequency estimation can be greatly reduced by adding all the products $B0_{n,m}$ together for all values of m, and over a limited range of n from p to p+Q, where Q is a fixed integer, giving a combined estimate of the autocovariance $R_p$ where $$R_p \cong \sum_{n=p}^{p+Q}\sum_{m} B0_{n,m} + \text{Noise} \quad \text{(Equation 3)}$$

Owing to the summation of a large number of values of $B0_{n,m}$, most of which have a similar argument, the first term in this expression for $R_p$ greatly exceeds the noise, so the argument of $R_p$ consequently provides a good estimate of the angular frequency $\omega_p$ of the signal modulation through the equation:

$$\omega_p \cong \frac{1}{N\tau}\arg(R_p) \quad \text{(Equation 4)}$$

The errors in the estimation of the signal frequency due to speckle, and hence the variations in this frequency due to target vibrations, are therefore greatly reduced by firstly obtaining the autocovariances of the signals from each receiver separately in accordance with Equation 2, then summing the autocovariances from all receivers in accordance with Equation 3, and finally obtaining the frequency from the argument of the resulting summation in accordance with Equation 4.

The total number Q of pulse pairs from each receiver which are added together is chosen so that the record length $Q\tau$ is less than the smallest period of vibration of target surface 6a, consequently variations in angular frequency $\omega_p$ for different times represented by different values of integer p will correspond to fluctuations in the Doppler frequency of scattered light from target surface 6a. An output 140 from the computer 139 which represents the time-varying angular frequency $\omega_p$ either in digital or analogue form, therefore represents the vibration of target surface 6a.

Accordingly, a signal proportional to the vibrational velocity of the target is derived which is relatively free from speckle noise.

It will be appreciated that although the embodiments referred to above use laser light, any suitable form of radiation may be used to illuminate the remote target 6.

It will be appreciated that the specific embodiments described above are representative of only two ways in which multiple input devices may be used to reduce the effect of speckle noise in a laser vibrometer. It will be appreciated that other suitable combination of devices may be used in such a manner to achieve the same result.

The invention claimed is:

1. A laser vibrometer for identifying remote targets by detecting mechanical vibrations therein, said vibrometer having an array of coherent optical receivers for collecting a portion of laser light reflected by a remote target, each receiver providing an output, and signal processor means comprising an autocovariance processor having multiple inputs for combining said outputs of the receivers to produce a signal representative of the remote target and for removing laser speckle.

2. A laser vibrometer according to claim 1, wherein the signal processor means comprises a phase-locked loop having multiple inputs, in which the signal derived from the multiple inputs is representative of the remote target, substantially unaffected by laser speckle.

3. A laser vibrometer according to claim 2, wherein the phase-locked loop comprises multiple signal multipliers, said multipliers multiplying the input signals by a second signal generated by a voltage controlled oscillator.

4. A laser vibrometer according to claim 3, in which the further signal comprises a sinusoidal or a square wave.

5. A laser vibrometer according to claim 2, in which the phase-locked loop further comprises multiple low pass filters, said filters having cut-off frequencies in the kilohertz region.

6. A laser vibrometer according to claim 3, wherein:
the phase-locked loop further comprises a summing amplifier which sums the signals generated by the multiple low pass filters and outputs a signal to an integrator;
the integrator outputs a signal to an input of the voltage control oscillator; and
said voltage control oscillator generates a signal which is input into the inputs of the multiple signal multipliers.

7. A laser vibrometer according to claim 1, in which the signal processor means comprises an autocovariance processor having multiple inputs, in which the signal derived from the multiple inputs is representative of the remote target, substantially unaffected by laser speckle.

8. A laser vibrometer according to claim 1, wherein the signals output by the multiple receivers are passed to conversion means, said conversion means sampling the input signals to produce digital outputs in response to timing signals generated by a timing pulse generator.

9. A laser vibrometer according to claim 8, in which the signals output by the multiple receivers are further passed to time delay means, said time delay means delaying the input signals by approximately 0.25 of a cycle at the centre frequency of the signals.

10. A laser vibrometer according to claim 9, in which the time-delayed signals are passed to further conversion means, said further conversion means sampling the input signals to produce digital outputs in response to timing signals generated by a timing pulse generator.

11. A laser vibrometer according to claim 10, further comprising summation means, for receiving the first and second converted signals, said converted signals comprising signal pairs, and performing a summation on said pairs of signals, said summation causing the signal due to the laser speckle to be greatly reduced and a signal representative of the mechanical vibration of the remote target to be output by the summation means.

12. A laser vibrometer for identifying remote targets by detecting mechanical vibrations therein, said vibrometer having an array of coherent optical receivers for collecting a portion of laser light reflected by a remote target, each receiver providing an output, and signal processor means for combining said outputs of the receivers to produce a signal representative of the remote target and for removing laser speckle; wherein
the signal processor means comprises a phase-locked loop having multiple inputs and multiple low pass filters, wherein the signal derived from the multiple inputs is representative of the remote target, substantially unaffected by laser speckle; and
the phase-locked loop further comprises a summing amplifier which sums the signals generated by the multiple low pass filters and outputs a signal to an integrator.

13. A method of detecting the mechanical vibrations of a remote target using a laser vibrometer, comprising the steps of:
(a) illuminating the remote target with laser light;
(b) collecting a portion of the laser light reflected by the remote target by means of an array of coherent optical receivers, each receiver providing a coherent output;
c) processing said outputs by combining together said outputs in an autocovariance processor having multiple inputs in order to generate a signal representative of the mechanical vibration of the remote target that is substantially unaffected by laser speckle.

* * * * *